Jan. 18, 1944.  F. S. SMITH  2,339,733
METHOD AND APPARATUS FOR DESTROYING INSECT LIFE
Filed July 16, 1940  2 Sheets-Sheet 1
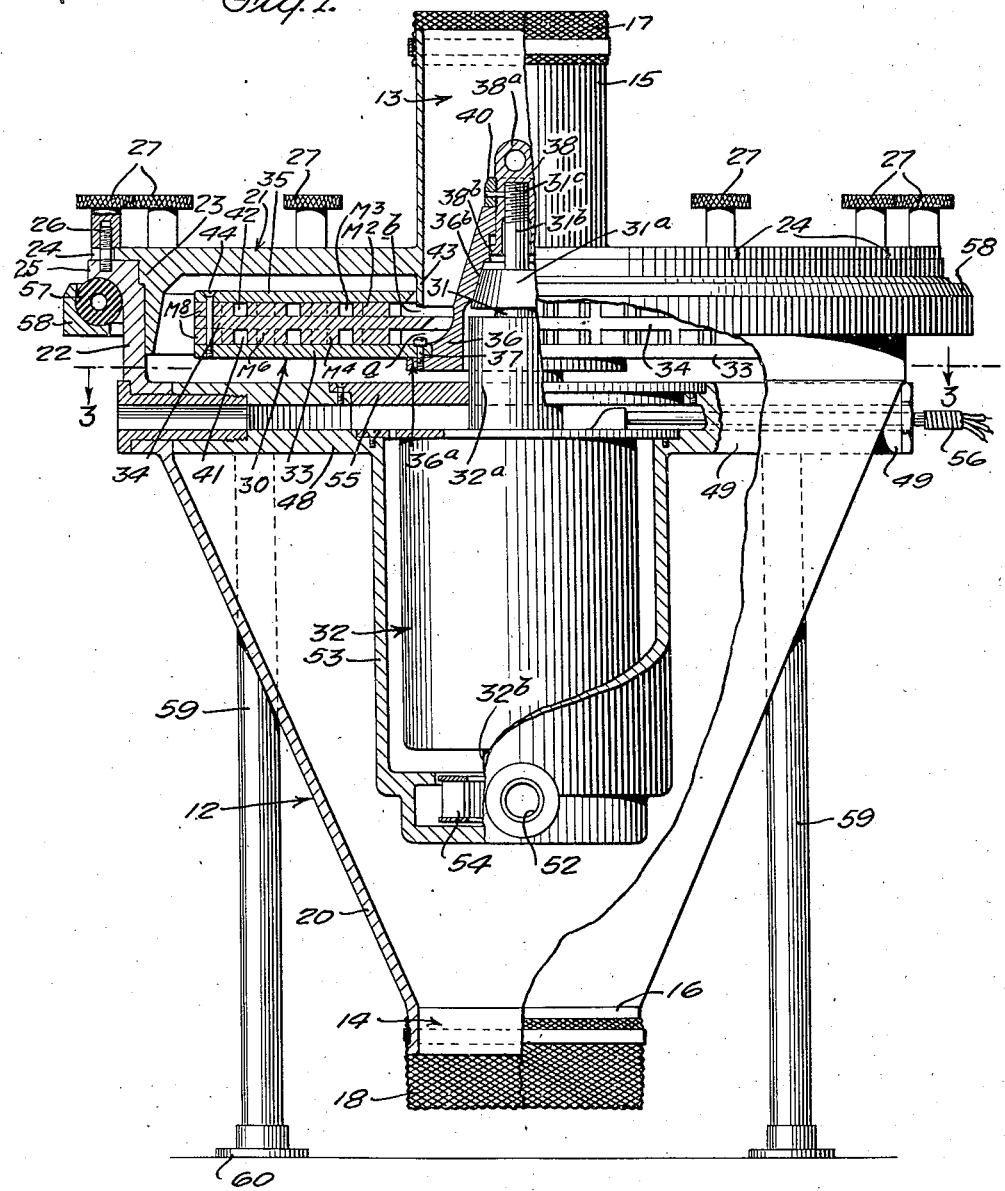
INVENTOR
FRANKLIN S. SMITH
BY
ATTORNEY

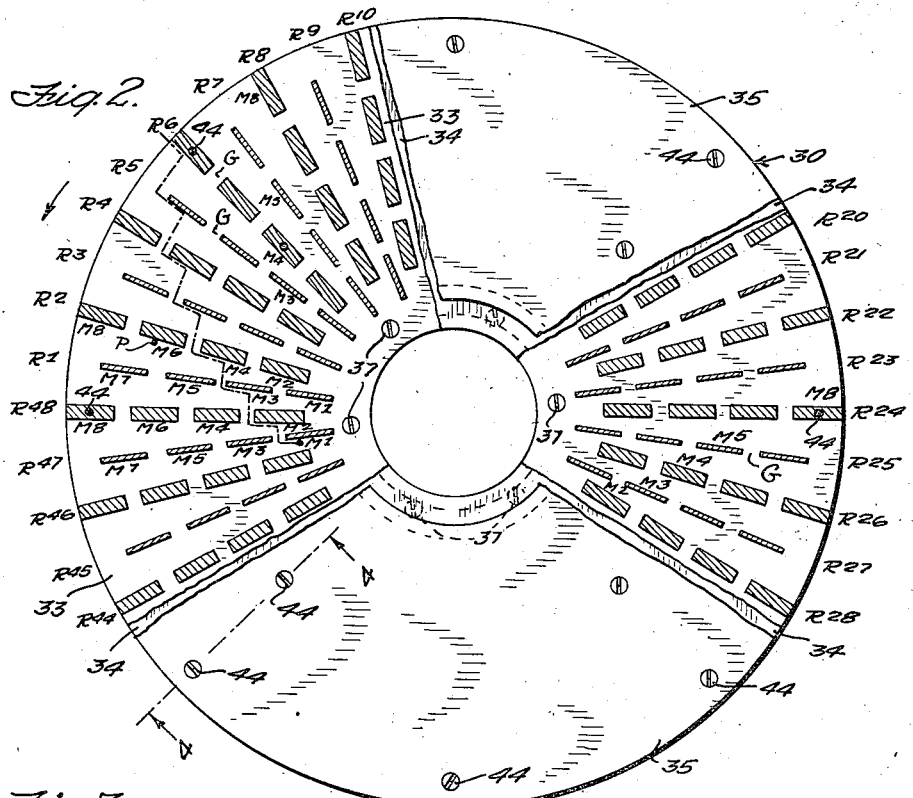
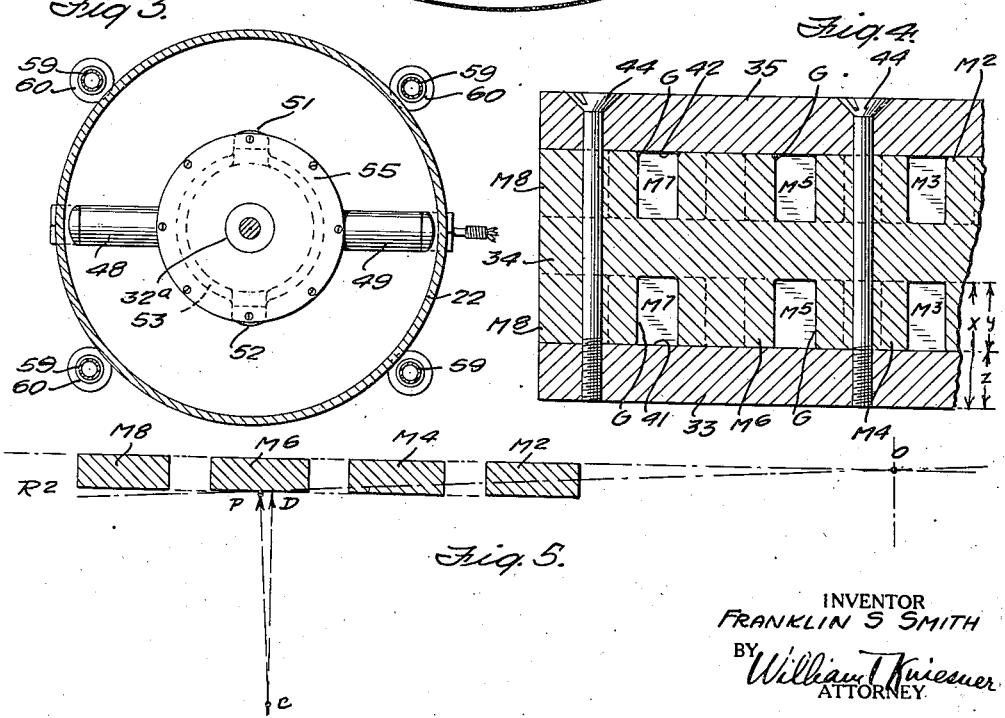

Patented Jan. 18, 1944

2,339,733

UNITED STATES PATENT OFFICE 2,339,733

METHOD AND APPARATUS FOR DESTROYING INSECT LIFE

Franklin S. Smith, New Haven, Conn.

Application July 16, 1940, Serial No. 345,715

14 Claims. (Cl. 21—2)

This invention relates to treating materials and more in particular to a method and apparatus for effecting the destruction of all insect life in a flowable product composed of individual solid parts such as flour or the like.

One of the objects of this invention is to provide a dependable and practical method and apparatus for destroying the life of all insect infestation contained in various products, such as milled food products like flour, coarse products like certain animal feeds, etc., and which may be present therein in various of its stages, such as in the form of eggs, larvae, pupae, or adults. Another object is to provide a simple, practical and efficient method for effecting destruction of the life in insect infestation that may be readily carried on in practice and that is capable of being carried on at rates appropriate to the rates of production of such products. Another object is to provide an apparatus of the above-mentioned nature that can be conveniently incorporated into usual or existing mill equipment used in the production or handling of products of the above-mentioned character. Another object is to provide an apparatus of the above-mentioned character capable of dependable and efficient action at a capacity appropriate to the capacity of the line of mill or factory equipment with which the apparatus is associated and throughout the long periods of operation of such equipment. Another object is to provide an apparatus of the above-mentioned nature that will be easy to clean and otherwise capable of low cost of maintenance in practical operation. Another object is to provide a dependable and efficient method and apparatus for destroying life in insect infestation in products the particles of which are of sufficient size, as for example in certain animal food products, to harbor within them stages of insect infestation.

Another object is to provide an apparatus of the above-mentioned character that will be of strong, rugged and long-lasting construction and of reliable action in the handling or treatment of bulk milled products or in the destruction of the insect infestation in whatever stage it happens to be present. Another object is to provide a method and apparatus for achieving the destruction of the life of insect infestation in products of the above-mentioned character in a simple, reliable and efficient way and well adapted to meet the varying conditions of practical use. Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings in which is shown one of the various possible embodiments of the mechanical features of my invention, Figure 1 is a front elevation of the apparatus with certain parts thereof broken away and with certain other parts shown in central vertical section;

Figure 2 is a view of the flour treating unit employed in the apparatus of Figure 1, shown partly in elevation and partly in section;

Figure 3 is a horizontal sectional view of the apparatus as seen along the line 3—3 of Figure 1;

Figure 4 is a vertical sectional view on an enlarged scale as seen along the line 4—4 of Figure 2 showing certain details of the treating unit and a preferred manner of construction and assembly thereof; and, Figure 5 is a diagrammatic representation of certain forces.

Similar reference characters refer to similar parts throughout the several views of the drawings.

As appears better from Figure 1, the apparatus preferably comprises a casing-like structure generally indicated by the reference character 12 having preferably an upper inlet passage 13 and a lower outlet passage 14 to facilitate connecting the apparatus at any suitable point in the usual production equipment or routine employed in the milling of products, such as flour; these passages may be formed as by flanges 15 and 16 preferably alined along the vertical axis of the casing 12 and having connected thereto suitable lengths of tubular conduit 17 and 18, respectively, usually made of a suitable flexible material like fabric, cloth, or the like.

The casing structure 12 comprises several sections, such as a lower section 20, which is frustoconical in shape and an upper casing section 21, respectively carrying the flanges 16 and 15, and suitably shaped detachably to interfit. Thus, casing section 20 has an upper cylindrical portion 22 which receives and is interfitted with a cylindrical or flange portion 23 from the upper casing section 21, the latter having a flange 24 overlapping the relatively heavy outwardly directed flange extension 25 of the portion 22 of the lower casing section, the overlapping parts 24 and 25 being provided with suitably peripherally distributed securing or clamping devices, such as studs 26 in the part 25 received through holes or slots in the flange 24 to receive nuts 27. Thus, the two casing sections may be readily assembled or disassembled.

Within the casing structure 12 is rotatably supported the rotary flour-treating unit, generally indicated by the reference character 30, by way of a shaft 31 whose axis is coincident with the vertical axis of the casing structure 12. Where, as in the preferred case, it is desired to drive the unit 30 electrically, shaft 31 preferably comprises the shaft of an electric motor 32 having upper and lower bearings 32ª and 32ᵇ, such as combined radial and thrust anti-friction bearings, for supporting the shaft 31, and being internally constructed in any suitable way, illustratively to have the characteristics of a polyphase alternating current induction motor. A preferred or illustrative mounting or support for the motor 32 within the casing 12 is later described.

The flour-treating unit 30 is illustratively constructed to comprise two or more, illustratively three, annular plate members held in spaced relation and presenting adjacent faces the planes of which are preferably at right angles to the axis of rotation of the unit; I provide for the movement of the infested product through the spaces between these faces and in these spaces I provide means, as is later described, to coact, during rotation of the rotary unit, in effecting destruction of life of the insect infestation in the product.

The above-mentioned three plate members are indicated in the drawings by the reference characters 33, 34 and 35 having therebetween annular spaces 41 and 42; one of these plate members, preferably the lowermost plate member 33, serves as a carrier for the others and at its center is provided with a hub 36 which is made as a part separate from the plate 33 and has a seat 36ª for concentrically receiving the annular plate 33, the two parts being secured together as by screws 37, so that the hub 36 forms a part of the rotary unit 30. By means of hub 36 the rotary unit may be carried by the shaft 31 and arrangement is made for ease of assembly and disassembly.

Thus, the shaft 31 has a tapered portion 31ª with which a correspondingly tapered bore 36ᵇ of the hub 36 interfits, suitable means being provided to secure the shaft and hub together. Thus, the shaft 31 may have an end portion 31ᵇ threaded as at 31ᶜ to receive an internally threaded sleeve 38 formed at its upper end to provide an eye 38ª and at its lower end a peripheral flange 38ᵇ normally accommodated in a bored out portion of the hub 36; the latter has a central bore within which the sleeve 38 is rotatably received, the latter being assembled thereto by entering the eye-end through the bore from the lower end thereof whereupon a collar 40 is secured externally to the sleeve 38, as by threading and pinning.

By means of the eye 38ª and with the upper casing section 21 not yet in place, the rotary treating unit 30 may be let down into the apparatus and the tapered bore 36ᵇ of the hub 36 seated onto the tapered shaft part 31ª; upon rotating the sleeve 38 to thread it downwardly relative to the shaft end 31ᶜ, collar 40, engaging the upper external end of the hub 36, clamps the latter securely against the tapered shaft part 31ª. For disassembly of the unit from the shaft, sleeve 38 is rotated in reverse direction, that is, to unthread it from the shaft part 31ᵇ, the sleeve flange 38ᵇ thereby being brought into engagement with the upper end of the counterbore in the hub 36 and acting to withdraw the tapered seat 36ᵇ from the tapered shaft part 31ª.

The inner plate members 33, 34 and 35 are preferably equidistantly spaced from each other and the inner annular edges of plates 34 and 35 are beveled off, to provide an end or edge face that extends at an angle to the axis of rotation suitable to prevent flour, which enters the spaces 41, between the annular plates through the annular mouth-like inner ends of these spaces, from being retained thereagainst and also for guiding the flour thereinto. Flour enters the apparatus through the passageway 13 coaxial with which is the hub structure 36—38, the latter having the effect of causing the stream of entering flour to be, in a general sense, of annular cross-section. Where more than one flour-treating space is provided in the unit, such as the two annular spaces 41, 42 in the unit 30, I prefer to divide the downwardly moving annularly cross-sectioned stream of flour or like product equally, or nearly so, amongst the several spaces, and I may employ an arrangement like that described in my co-pending application Serial No. 321,680. Thus, the lower part of hub 36 is concentric with the inner edge of plate member 34 to provide an annular gap whose area is equal to the area of the annular space or gap which in vertical projection extends between the inner face of the downward extension 43 of the flange part 15 and the inner peripheral edge of plate member 34, thus sub-dividing the downwardly moving stream of product into two annular streams of equal volume which are passed outward radially into the spaces 41, 42 whose inner mouths or orifices, by giving the flange extension 43 a suitable spacing above the plate 34 relative to the spacing between plates 33 and 34, are of substantially equal area.

Thus, with the unit 30 rotating at a suitable speed, the downwardly moving stream of product and its entrained and accompanying air are uniformly distributed to the several treating spaces, such as spaces 41 and 42. More specifically the downwardly moving flour or other product is intercepted by the external faces or surfaces of the rotating hub 36 and the annular inner portion of plate 34 and is caused to exert sufficient centrifugal force to move it through the entry ends of, and thence into, the spaces 41 and 42, respectively. These actions are aided by a suction effect caused by an impeller-like forced flow of air through the unit as later described.

Within the spaces 41 and 42 I provide a suitable number of members or parts which, in coaction with the centrifugal force exerted by the flour and its insect infestation within the spaces effects destruction of the life of the latter and in the preferred form these members or parts also serve as spacing means for the several annular plate members. Also, in this embodiment and to facilitate manufacture, certain of these members or parts are formed integrally with certain of the plate members. This construction and arrangement may be better understood upon consideration of a preferred manner of making and assembling the plate members and related members or parts that make up the treating unit 30.

Thus, considering Figures 1, 2 and 4, plate member 33 may be formed out of an annular plate of substantial thickness, a thickness indicated at $x$ in Figure 4, by suitable milling operations, using a suitable indexing device, the upper face of plate 33 is milled out in generally sector-shaped portions to a depth indicated at $y$ in Figure 4, thus leaving what is in effect a plate member 33 of a thickness $z$ in Figure 4, having integrally formed therewith and upstanding therefrom a suitable number of equiangularly spaced and generally radially extending ribs which are broken up into individual members or parts by a turning operation as in a lathe and to the depth $y$; for greater convenience of manufacture, the turning operations, comprising the turning of concentric grooves to the depth $y$ in the upper face of the initial annular plate of thickness $x$, preferably precedes the above described milling operations. Referring to Figure 2, the member 33 may thus be constructed to have 24 equiangularly spaced rows $R^1$, $R^3$, $R^5$, $R^7$, $R^9$—$R^{47}$ of four members $M^1$, $M^3$, $M^5$, $M^7$ equidistantly spaced from each other and all of the same height $y$ of Figure 4. Thus, the angular relationship between the rows $R^1$, $R^3$, $R^5$, etc., may be achieved by milling, and the spacings between the members $M^1$, $M^3$, $M^5$ and $M^7$ and the spacings of the end members $M^1$—$M^7$ from the inner and outer edges of the plate 33 may be achieved by the turning operation.

The under face of plate member 34 may in a generally similar way be provided with downwardly directed equiangularly spaced rows $R^2$, $R^4$, $R^6$—$R^{48}$ of members $M^2$, $M^4$, $M^6$, $M^8$ of a height $y$, as in Figure 4. In a general radial direction, the spacings between successive members are the same on both plates 33 and 34, and the radial dimension of all of the members on both plates is preferably the same, but the rows $R^2$, $R^4$, etc., on plate 34 commence at the periphery of plate 34. Plates 33 and 34 are assembled to each other so that each row of members on one plate substantially bisects the angle between the two rows on the other plate between which that row extends, and with all of the members having the same height, the upper end faces of the members $M^1$, $M^3$, etc., of plate 33 engage the under face of plate member 34 and the lower faces of the members $M^2$, $M^4$, etc., of the plate 34 engage the upper face of the plate 33. In this relationship, the two plate members 33 and 34 are secured together.

A similar relationship of members or parts $M^1$, $M^2$, $M^3$, $M^4$, etc., exists in the other space or spaces, such as space 42 between the plates 34 and 35, and it may be achieved by a similar construction. Thus, the upper face of plate member 34 may have projecting upwardly therefrom 24 equiangularly spaced rows $R^2$, $R^4$, $R^6$—$R^{48}$ of members or parts $M^2$, $M^4$, $M^6$, $M^8$ similarly positioned as are the corresponding members on the under side of plate 34, while projecting downwardly from plate 35 and alternated with the rows $R^3$, $R^4$, $R^6$, etc., are the rows $R^1$, $R^3$, $R^5$—$R^{47}$ of members $M^1$, $M^3$, $M^5$, $M^7$, and positioned similarly as are the upwardly directed members or parts of plate 33.

These various and thus distributed members or parts, in this form of construction, thus serve also as spacers or supports for the various plates and suitable means may be employed to hold the several plate members, with their concentrically disposed members, in concentric relation to each other and such means may comprise a suitable number of uniformly distributed screws 44 arranged as shown in Figure 4. Thus, each screw may be a flat-headed screw that passes through a countersunk hole in the plate member 35 and through an alined hole in plate member 34, and the juxtaposed or oppositely directed members $M^8$, $M^8$ of the latter, the lower end of the screw being threaded into the lower plate 33. As indicated in Figure 2, the screws 44 are uniformly distributed about several circles of different radii; thus, there may be an outer circle of screws 44 which pass through members $M^8$, $M^8$ and an inner circle of screws which pass through members $M^4$, $M^4$. The members $M^2$, $M^4$, $M^6$, $M^8$ of the plate member 34 are preferably of greater thickness than the members $M^1$, $M^3$, $M^5$, $M^7$ of the other plate members, thus better to accommodate the above-mentioned screws. With the screws uniformly distributed and with the members $M^1$, $M^2$, $M^3$, $M^4$ etc., likewise uniformly distributed, the rotary treating element 30 is structurally suited for relatively high speeds of rotation, and it is preferably dynamically balanced.

In Figure 2 the arrow indicates the counter-clockwise direction of rotation of the treating unit 30, and in such case the leading faces of the circumferentially and radially spaced members $M^1$, $M^2$, $M^3$, $M^4$ preferably make an angle to the radius drawn to any point in the leading face, and where the members are arranged in straight rows, to facilitate manufacture of the treating unit by the method described above, such angularity is preferably achieved by having the rear or trailing faces of all of these members, where they are of uniform thickness, fall upon or line up with a radius; due to the thickness of the members, therefore, the leading faces thereof become displaced in the forward or leading direction of rotation and a suitable angularity thereof to a radius drawn to any point in any leading face results. This angularity is such that any particle of the insect infested product that is at any moment in engagement with a leading face, such as the particle P in Figure 5, bears against the leading face of a member M with a force or pressure represented by the vector PC which is at right angles to the radius PO to the axis of rotation. Where the treatment unit 30 rotates counter-clockwise, but due to the angularity above-mentioned of the leading face of the member M, the vector PC is resolved into two components one of which CD is normal to the leading face of the member M and the other DP is coincident with the leading face and its direction is outwardly toward the outer periphery of the treatment unit. Due to this latter component DP and its direction, therefore, the particle P partakes of movement in an outward direction along the leading face of the member M. A substantially similar action takes place at the leading face of each of the members $M^1$, $M^2$, $M^3$—$M^8$. It will be understood, of course, that this effect may be achieved by providing leading faces other than plane faces; they may, for example, be individually curved, preferably backwardly curved with respect to the direction of rotation, and the leading faces of any one row of members may be suitably alined in straight or curved rows with the curved faces leading.

By way of illustration, the spaces 41 and 42 may have an axial dimension of ½", the members $M^1$, $M^2$, $M^3$—$M^8$ thus have a vertical dimension, as viewed in Figures 1 and 2, of ½", and their length in a general radial direction may be ¾", and the radial dimension of the gaps $g$ on the order of 1/16", where the diameter of the plate members 33, 34 and 35 is 13". As earlier indicated, the gaps g are cut or formed so that, in a circumferential direction, each gap g in one row has juxtaposed to it a member of the next succeeding row, an arrangement which, as better appears from Figure 2, may be achieved by having every other row of equally spaced members displaced inwardly toward the center by an amount about equal to half the radial dimension of one of the members.

The product, such as flour, with its insect infestation, enters the spaces 41 and 42 in a general radially outward direction in a uniformly distributed stream through the annular gaps or orifices a and b, respectively, as above described, the flour-treating unit rotating in counter-clockwise direction at a suitable speed which, where the parts are dimensioned in the illustrative manner above set forth, and where the product to be treated is flour, may be on the order of 3450 R. P. M. Subsequent actions that take place are substantially the same for each of the treatment spaces so that it will suffice to consider in detail the treatment action of only one of them, such as the space 41 between the plate members 33 and 34.

In this connection and referring to Figure 2, the annular stream of flour flowing or spreading outwardly encounters first the innermost vertical edges of the fast-moving leading faces of the members $M^1$ of the rows $R^{47}$, $R^1$, $R^3$, $R^5$, etc., which, in effect, pick up or catch up, from the outwardly moving annularly cross-sectioned stream of product, in rapid succession, relatively small quantities or increments of the product and by such an action take part in effecting a substantially uniform distribution of moving flour particles and insect infestation into the space 41, this action being aided by the above-described angularity of the leading faces of these members $M^1$ which effects a movement of the particles of the product and of the insect infestation along the leading faces and in a direction toward increasing radius.

Due to the speed of rotation the linear velocity of the leading faces of the innermost members $M^1$ is sufficiently high to cause such particles to be pressed against the leading face by a force or pressure represented by the component CD of Figure 5 but at the same time the component DP is effective to cause such particles, while they are pressed against the leading face of the member to slide therealong and thus to increase its radial distance from the axis of rotation. With each increment of increase in radial distance of any particle, such as a form of insect infestation, from the center, its linear velocity correspondingly increases so that the components CD and DP increase as the particle progresses toward the outermost vertical edge of the leading face of the member. Its travel relative to the leading face is thus accompanied by an increase in the force with which it is pressed against the leading face.

Reaching the outer vertical edge of the leading face of a member $M^1$ (Figure 2), the particle enters the gap between members $M^1$ and $M^3$, loses velocity and is overtaken by the leading face of member $M^2$ which, relative to the particle, is traveling at a much higher velocity and thus strikes the particle with a substantial impact. The particle is now pressed against the leading face of member $M^2$ whence an action like that described in connection with the leading face of member $M^1$ is repeated so that before the particle emerges from the space 41 of the treatment unit, it has been successively impacted by members $M^1$, $M^2$, $M^3$, $M^4$, $M^5$, $M^6$, $M^7$, $M^8$, respectively, of rows $R^{47}$, $R^{48}$, $R^1$, $R^2$, $R^3$, $R^4$, $R^5$ and $R^6$, assuming the particle to have been first brought into engagement with the leading face of member $M^1$ of row $R^{47}$. The particles of the bulk product are thus propelled through the treatment unit in paths that are twisted curvilinear zig-zag paths; but air is being similarly impelled and propelled through the treatment unit and its effect upon the particles of the product and of the insect infestation is one of turbulency, causing a repeated rearrangement of them with respect to one another and in effect making them move in turbulent twister curvilinear zig-zag paths.

In Figure 2, the broken zig-zag line is not to be interpreted as a precise indication of the path which a particle might take and is intended to indicate in a general way one of various possible courses which a particle might pursue. It will be understood that there may be variations within the general course indicated in Figure 2 and that other zig-zag paths might be followed. For example, the relative velocities between the various parts and a particle may be such that the point at which the leading face of a succeeding member impacts the particle is displaced from the point or points indicated by the broken line of Figure 2, and may be, for example, nearer the outer edge of the impacting leading face.

Then again, the relative movements may be such that a particle leaving the leading face of one member, for example, member $M^2$ of Figure 2, instead of being impacted by member $M^3$, is impacted by member $M^5$, or the relative movements may be such, by way of further illustration, that a particle leaving the leading face of member $M^2$ of row $R^{48}$ passes (relatively speaking) through the gap between members $M^3$ and $M^5$ of row $R^1$ and is impacted by the leading face of member $M^4$ of row $R^2$. These are illustrative possible variations of, or departures from, the path suggested by the broken line of Figure 2, and it will be seen such other possible paths are also twisted curvilinear zig-zag paths. In such illustrative variations in path, destructive mutilation of the forms of insect infestation dependably takes place, it being noted that the velocity of impact may be, in such variations as are above suggested, on a higher order of magnitude, since the linear velocity of the points of impact, being at greater radial distances, is greater. Thus, it will be clear that the succession of members with which any one particle is brought into contact may be different from the kind of succession suggested by the broken line in Figure 2.

These successive impacts have a crushing effect upon the forms of insect infestation, effecting destruction of life therein; where the insect infestation is harbored within a particle of the product and further breaking up of the product particles is permissible or desirable, the particle, depending upon the nature of the product, being in effect a shell encasing the form of insect infestation, is subjected to such impact or impacts and is crushed or distorted or broken up with similar action upon the form of insect infestation, resulting in destruction of its life. Thus, also, forms of insect infestation, otherwise mechanically protected by such a shell effect, are dependably laid bare or exposed to the life-destroying action of the apparatus. But as each particle progresses along the leading face of the member with which it happens to be in contact and, in the above illustration such a particle, such as a form of insect infestation, will be seen to be made to progress in an outward direction and successively along the leading face of the above-mentioned members $M^1$, $M^2$—$M^8$, and its progression along any leading face is accompanied by a rubbing or abrading of the particle along and against the leading face at progressively increasing pressures, thus also having a distorting, crushing or breaking up action on the form of insect life. Dependable destruction of life results and the product discharges peripherally from the rotary treating unit 30 free from live forms of insect infestation.

With the earlier above-stated illustrative dimensions and speed of drive of the flour treating unit, centrifugal forces, increasing with the radius, are exerted by the forms of insect life on an order of magnitude appropriate to achieve life-destroying effects like those above set forth; thus, for example, a particle entering the treatment unit 30 and picked up by the leading face of a member $M^1$ (Figure 2) is set into motion at a velocity such that the centrifugal force exerted by the form of insect life is on the order of 760 times gravity. But as the particle or form of insect infestation progresses outwardly along the leading face of member $M^1$, giving it a path of enforced movement that is of increasing radius, the centrifugal force exerted increases since the radial distance of the particle from the axis of rotation increases. Each successive member M to which the particle or form of insect life is transferred is, however, of itself at a greater radial distance from the axis of rotation so that the centrifugal forces exerted are not only progressively increasing but also on a correspondingly higher order of magnitude, and again with the above set forth illustrative dimensions and speed of rotation, the centrifugal force exerted at the leading faces of the outermost member $M^8$ may be on the order of 2200 times gravity. Thus, aside from the successive crushing impacts to which a form of insect infestation is subjected, as it is successively transferred from one member to the next, there is also a progressively increasing intensity of abrading or rubbing pressure, and dependability of life-destroying action insured. The known formula, namely, centrifugal force times gravity equals peripheral velocity squared divided by the product of the radius and the acceleration of gravity, may be used as a general guide.

Also, in providing for the discharge of the product successively from one member to the next of any available series of members, illustratively the one enumerated above, an advantageous rearrangement of any given relationship between a form of insect life and the flour or other material undergoing treatment may take place; thus, any tendency, at the leading face of one member, for flour particles to cushion a form or stage of insect infestation by the time the latter reaches the discharge edge of the member, is substantially negatived, in ultimate effect, by a new relationship between flour particles and form of insect infestation established when impacted against the next succeeding member. But preferably the dimension in a general radial direction of the members $M^1$—$M^8$ is such that any such cushioning relationship, that might be initially established at the leading face of a member M adjacent its innermost vertical edge, is overcome by a thinning out of the layer of flour particles, resulting from the effects thereon of the increasing centrifugal forces they exert, by the time the form of insect life reaches the outer or discharge vertical edge of the leading face. Also, the turbulency effected, as earlier above set forth, by the flow of air propelled through the unit aids in bringing about rearrangements of the product particles, and the particles of insect infestation, and in thinning out of layers of the product.

These various actions may be varied according to circumstances, such as the material or product to be treated, the rate at which the material is desired to be handled, the character of insect life in the particular material, and others. Thus, the inclinations of the leading faces of the members $M^1$—$M^8$ may be changed to vary, as may be desired, the magnitude of the component DP of Figure 5, the rate of rotation may be changed, and other factors likewise varied, such as radial dimension of the members M, the number of them in their radial rows, the maximum and minimum radii, etc., having appropriate regard to insuring that the stages of insect infestation exert sufficiently large centrifugal forces to bring about the life-destroying actions like those above described.

Preferably, the treatment surfaces of the treatment unit 30 and with which the material with its insect infestation coacts are constructed to resist wear and corrosion. A convenient and preferred construction utilizes a suitable aluminum alloy with their surfaces anodized, giving them a high degree of hardness and good resistance to wear. Other parts of the apparatus, for example, the casing sections 20 and 21, may similarly be constructed. Thus, the interior face of the flange part 23 of the casing section 21, against which the product is discharged from the treatment unit 30 and by which it is deflected and guided downwardly into the casing section 20 may in this manner be given high resistance to wear and the same advantage may be in a similar way achieved with respect to the internal surface of the casing section 20 down which the treated material flows to be discharged through the conduit 18. Also, when these parts are made of anodized aluminum alloy, harmful effects, such as corrosion, which might otherwise be caused by gases that might be present with the material being treated and which might have a strong corrosive action on metals, are counteracted or avoided.

As above noted, the rotary treating unit is preferably dynamically balanced. It will be noted that the dimensions of the spaces in the unit and through which the product moves may be given dimensions relatively large as compared to the physical dimensions of the largest form of insect infestation to be destroyed; the construction has good capacity. Since, however, unbalanced conditions might arise during operation of the apparatus, such, for example, as might follow from a non-uniform distribution of the product undergoing treatment, it is preferred to provide a mounting or construction that permits the rotating mass to assume as a center of gyration the center of gravity of the rotating mass and its unbalanced load.

Preferably, the parts are so proportioned that the upper bearing of shaft 31, in the motor part 32ª is at the center of gravity of the rotary treating unit 30, thus to avoid shaft deflection. In one possible arrangement the motor 32 is rigidly secured to the casing section 20 as, for example, by two diametrically opposed bracket structures 48 and 49 near the upper end of the motor structure and two diametrically opposed bracket structures 51 and 52 at the lower end, the two pairs (see Figure 3) of brackets being substantially at 90° to each other.

Preferably, the motor is air-cooled and hence has an outer jacket or casing 53 to and within which the motor structure 32 is secured in any appropriate way and in such case the above-mentioned brackets are related to the jacket or may in part be formed integrally therewith. The upper brackets 48, 49 are hollow or tubular (see Figure 1) and one of them, such as bracket 48, may serve as an inlet for air which is drawn into the space between the motor 32 and the jacket 53 by an air impeller 54 arranged in the lower end of the jacket 53 and secured to and driven by the lower end of the motor shaft 31. The lower brackets 51 and 52 are preferably also hollow and serve as outlets for the discharge of air externally of the casing structure 12. The air, in its movement past the motor 32, absorbs the heat produced. The upper end of the jacket 53 may be closed off by an annular plate-like member 55 constructed to interfit at its outer periphery with the upper end of jacket 53 and provided with a collar-like portion at its central part to engage and support the bearing part 32ª of the motor 32. Through bracket 49, also preferably hollow, insulated conductors 56 may be passed to connect the motor to a suitable power circuit. Details of this form of air-cooled motor structure and mounting are dealt with in my co-pending application Serial No. 296,544, filed September 26, 1939.

Thus, the shaft 31 is given a rigid and dependable mounting within the casing structure 12; the under face of the flange part 25 of the lower casing section 20 is suitably shaped, as by concaving it (Figure 1) to form a continuous peripheral seat for a resilient or cushioning member 57 preferably made of rubber and preferably made in tubular form and sufficiently thick-walled to give the desired resiliency of action. Cushioning member 57 rests in an upwardly concaved preferably continuous seat formed in a ring-like frame member 58 to which at suitably spaced points, illustratively four (Figures 1 and 3) are secured vertically extending legs or standards 59 provided at their lower ends with suitable flange means 60 by which they may be secured to a suitable supporting surface, such as a floor.

The horizontal median plane through the cushioning member 57 which thus forms a resilient or yielding support for the entire casing and the apparatus mounted therein is at or slightly above the center of gravity of the rotating parts, such as the treatment unit 30, the shaft 31, and the rotor of the motor 32.

With the rotating parts constructed and assembled or otherwise dynamically balanced, any condition of unbalance arising during the operation of the apparatus is prevented from over-stressing parts rotating at high peripheral velocities and from causing damage or unsafe vibration. When the rotating mass becomes dynamically unbalanced, the yieldability of the member 57 permits such a shifting of the axis of the entire apparatus that is thus supported from the frame member 58 as corresponds to a precessional motion, the extent of which, however, is limited by the resiliency of the member 57. Because the center of gravity of the rotating parts is coincident with or slightly below the plane of the effective support provided by the resilient member 57, this precession is stable, the resilient member 57, by its resistance, retarding the precession and ultimately completely negativing it, restoring the rotating mass to a position with its axis in normal position. The yieldability and resiliency of the member 57 also tend to prevent the transmission of vibration to the frame structure 58—59. The resilient mounting thus permits the rotating parts and the load represented by the material undergoing treatment to assume, as a center of gyration, the center of gravity of the rotating parts with the load.

Thus, I may make simple and dependable provision for counteracting conditions of unbalance as they might arise. However, I have found in practice that, with a construction of rotary treatment unit like that above described, I am enabled to achieve dependable destruction of life of the insect infestation at speeds of rotation considerably less than might be required with other forms of rotary treating unit; with the illustrative dimensions of unit earlier set forth above, I may, for example, utilize speeds materially less than the above-stated illustrative speed of 3450 R. P. M. The lower the speed the lesser in magnitude are the effects, such as vibration, and the like, of conditions of unbalance, and correspondingly a lesser degree of provision for counteracting dynamic unbalance, as by such means above-described, can be made if desired. That good results follow at lesser peripheral velocities is probably due to the effective coacting action of the succession of impacts which any form or stage of insect infestation, with resultant breaking up, deforming, crushing or destroying action, receives as it is successively transferred from one member to another (Figure 2) in achieving an ultimate transition from the inlet region of the treating unit adjacent its axis to the outlet region thereof about its periphery.

Where the product to be treated is flour, a desirable or preferred rate of flour flow is on the order of twenty-five barrels of flour per hour, per treatment space of the rotary treatment unit, where the elements of the treatment space or spaces have the dimensions illustratively set forth above and the speed of drive is on the order of 3450 R. P. M. An apparatus having two treatment spaces, 41, 42, like that shown in the drawings, would thus handle fifty barrels of flour per hour, at this preferred rate of flour flow. Any suitable means (not shown) and preferably related to the intake conduit of the apparatus may be used to regulate or govern the rate of flow of the product.

Other speeds of drive and other rates of flow may be employed, and at lower speeds, the net energy consumption is less for a given rate of flow of the product. For example, at 1725 R. P. M., the net wattage is about 750 per treatment space at a rate of flow of flour of about 12½ barrels per hour per treatment space, or about 1500 watts for an apparatus of two treatment-spaces each handling twenty-five barrels an hour; at 3450 R. P. M., the net wattage is about 2600 per treatment space, at a rate of flour flow of twenty-five barrels per hour per treatment space. And like the physical dimensions illustratively set forth above, these data or figures are to be interpreted as also illustrative and not in a limiting sense.

The top casing section 21 is readily removable upon disengaging the securing devices 27, thus giving access to the interior of the apparatus. The treatment unit 30 may be easily removed, the eye portion 38ª of the sleeve member 38 permitting the latter to be readily turned to unthread it from the threaded portion 31ᶜ of the shaft 31, thereby withdrawing the clamping collar 40 from the hub part 36 and bringing flange part 38ᵇ into lifting engagement internally of the hub part 36, thus withdrawing the latter (with the treatment unit 30 secured to it) out of engagement with the tapered part 31ª of the shaft 31. By means of the eye member 38ª, therefore, the entire unit may be raised or lifted out of the apparatus for such purpose as repair, replacement, or cleaning. However, it will be noted that cleaning, when necessary, of the spaces and surfaces within the treatment unit 30, may be conveniently carried on without having to remove the treatment unit from the apparatus, for access thereto is easily gained upon removal of the upper casing section 21, whence the relatively large channels or spaces within the treatment unit and the various surfaces thereof may be cleaned by any suitable means, such as, for example, by means of an air nozzle or other suitable means to provide a blast of air.

In referring to the flow of the product, the term "substantially unrestricted passageway" is used in the sense that all of a flowable product composed of individual solid parts, such, for example, as flour, meal, etc., will flow through the passageway without stoppage. In this sense, the passageway must be free of restrictions or configurations which might stop, trap or pocket any of the parts of the product to interfere with the operation of the machine.

The term "lethal trauma" is used in the sense that a fatal physical injury is inflicted. Accordingly, during treatment, each entity or particle of insect life is physically injured, mutilated, or deformed, to cause death.

Thus, it will be seen that there has been provided in this invention a method and apparatus in which the various objects heretofore noted, together with many thoroughly practical advantages, are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. In apparatus for effecting the destruction of all insect life in a flowable product composed of individual solid parts, the combination of, a rotary treating device having two opposed axially spaced surfaces defining a treating space through which the product flows, the smallest dimension between said surfaces being larger than the largest of said parts of said product, a plurality of impacting members disposed between said surfaces in the path the product takes when flowing through said treating space, there being at the central portion of the device an inlet forming a substantially unobstructed passageway to allow a substantially even stream of said product to flow to said treating space, means to feed said product to said inlet, and means to rotate said rotary device to propel centrifugally the product outwardly through said treating space to provide a life-destroying impact between every individual particle of insect life in the product and at least one of said impacting members, said apparatus including a product outlet extending substantially around said treating device through which the product falls away from said treating device.

2. In apparatus for effecting the destruction of all insect life in a flowable product composed of individual solid parts, the combination of, a rotary treating device having a supporting surface and a central product-deflecting portion to receive the incoming product and deflect the product in an even stream radially along said supporting surface, confining means spaced from said supporting surface, said supporting surface and the opposed surface of said confining means bounding the treatment zone, said treating device having a plurality of impacting members rigidly mounted with respect to said supporting surface and extending through said treatment zone with each member providing an impacting surface, means for supplying the product to said product-deflecting portion, and means for rotating said treating device at a high speed to flow the product away from the axis of rotation through the treatment zone and during the movement of the product through the treatment zone to engage each particle of insect life with at least one of said impacting surfaces with such force as to inflict lethal trauma on all of the insect life.

3. Apparatus as described in claim 2 wherein said impacting members are substantially equally spaced circumferentially on said treating device.

4. Apparatus as described in claim 2 wherein said means for supplying the product is a stationary chute extending axially toward said supporting surface and wherein said product deflecting portion is a tapered hub extending from said supporting surface into the open end of said chute so that said hub cooperates with said chute to provide an annular inlet for the product through which the product flows toward said treatment zone.

5. Apparatus as described in claim 2 wherein said treating zone is divided in an axial direction into separate treating spaces with impacting members spanning each of said treating spaces.

6. Apparatus as described in claim 2 wherein said rotary treating device is formed by two parallel circular plates and an intermediate spacing plate with said intermediate plate having integral projecting members on its two opposite faces which constitute said impacting members and which act as spacing means against which said circular plates are rigidly held to thereby define two treating spaces.

7. Apparatus as described in claim 2 wherein said impacting members are positioned in a plurality of circumferentially spaced rows extending away from the axis of rotation.

8. In apparatus for effecting the destruction of all insect life in a flowable product composed of individual solid parts, the combination of, a rotary treating device having two axially spaced plates the opposed surfaces of which define a treating space, the minimum dimension between said surfaces being greater than the maximum dimension of the parts of the product, a plurality of radially spaced impacting members spanning said treating space between said axially spaced surfaces, one of said plates having a central annular inlet opening, stationary feeding means projecting through said annular inlet opening substantially concentrically therewith, said treating device having a discharge opening at the outer periphery thereof, and means to rotate said treating device to centrifugally propel the product away from the axis of rotation and to rotate said impacting members to thereby provide a forcible impact between each particle of insect life and at least one of said impacting members to inflict lethal trauma on all the insect life in the product, said apparatus including a product outlet extending substantially around said treating device through which the product falls away from said treating device.

9. In apparatus for effecting the destruction of all insect life in a flowable product composed of individual solid parts, the combination of, product-directing means to direct the product in a supply stream at a controlled rate, and a rotary treating device having a treatment space positioned to receive said product from said product-directing means and to flow the product and thereby spread the product into a treating stream which is thinner and moving faster than said supply stream, said treating device having means associated therewith to confine said product wholly within said treatment space when said product is flowing through said treatment space, said treating device having impacting members extending transversely of said treating stream and spanning said treatment space which violently impact all of the insect life in the treating stream of the product thereby to inflict lethal trauma on all said insect life.

10. In apparatus for effecting the destruction of all insect life in a flowable product composed of individual solid parts, the combination of product-directing means to receive the supply stream of the product and to direct the product at a controlled rate in a substantially annular treating stream which is thinner and moving faster than the supply stream, and a rotary treating device formed by a pair of spaced circular plates having opposed surfaces defining the treatment space through which said treating stream flows from said product-directing means, said opposed surfaces cooperating with said product-directing means to provide a substantially unrestricted confining passage through which the product flows freely and to which the flow of the product is confined, said treating device having a plurality of impacting members spanning said treatment space which violently impact all of the insect life in the treating stream of the product thereby to inflict lethal trauma on all said insect life.

11. In apparatus for effecting the destruction of all insect life in a flowable product composed of individual solid parts, the combination of, a rotary treating device, confining means associated with said device and forming a treating space confined to the dimensions of said device and having an inlet forming a substantially unrestricted passageway to allow a substantially even stream of said product to flow freely to said treating space, the smallest dimension of said treating space being larger than the maximum dimension of the individual parts of said product, said treating device including a plurality of impacting members spanning said treating space, means to feed said product to said inlet so that it may flow through said treating space, and means to rotate said treating device at a high speed to provide a life-destroying impacting engagement between every individual particle of insect life and at least one of said impacting members during the passage of said product through said treating space, said apparatus including a product outlet extending substantially around said treating device through which the product falls away from said treating device.

12. In apparatus for effecting the destruction of all insect life in a flowable product composed of individual solid parts, the combination of, treating means comprising an assembly with stationary and moving product-confining surfaces, all of said stationary surfaces extending downwardly at an angle which allows said product to flow freely by gravity and all of said moving surfaces extending away from the center of movement at an angle to permit said product to flow freely along or away from said moving surfaces, said treating means defining the limits of a treatment zone whereby all of the product flows through said treatment zone, and a plurality of impacting members spanning said treatment zone and movably mounted to break through the stream of the product at a rapid rate to thereby violently impact every particle of insect life in the product to inflict lethal trauma on all said insect life.

13. In the art of destroying insect life in a flowable product composed of individual solid parts, the steps which comprise, flowing a stream of the product through a zone of treatment, and interfering with the movement of the insect life through the zone of treatment by mechanically impacting all of the insect life with sufficient mechanical violence and physical shock to inflict lethal trauma on all said insect life without stoppage of the flow of the product.

14. In apparatus for effecting the destruction of all insect life in a flowable product composed of individual solid parts, the combination of, a rotary treating device having two axially spaced plates the opposed surfaces of which define a treating space, the minimum dimension between said surfaces being greater than the maximum dimension of the parts of the product, one of said plates having a central annular inlet opening, a plurality of spaced impacting members radially spaced from said opening and spanning said treating space between said axially spaced surfaces, stationary feeding means projecting through said annular inlet opening substantially concentrically therewith, said treating device having a discharge opening at the outer periphery thereof, and means to rotate said treating device to centrifugally propel the product away from the axis of rotation and to rotate said impacting members to thereby provide a forcible impact between each particle of insect life and at least one of said impacting members to inflict lethal trauma upon all insect life in the product, said apparatus including a product outlet extending substantially around said treating device through which the product falls away from said treating device.

FRANKLIN S. SMITH.